(12) United States Patent
Lee (10) Patent No.: US 7,287,130 B2
(45) Date of Patent: Oct. 23, 2007

(54) STORAGE MEDIUM ON WHICH DATA CAN BE FURTHER WRITTEN AFTER FINALIZATION AND APPARATUS AND METHOD FOR RECORDING AND REPRODUCING DATA USING THE STORAGE MEDIUM

(75) Inventor: Sang-am Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 263 days.

(21) Appl. No.: 10/355,235

(22) Filed: Jan. 31, 2003

(65) Prior Publication Data

US 2003/0167382 A1  Sep. 4, 2003

(30) Foreign Application Priority Data

Jan. 31, 2002  (KR) ................. 2002-5647

(51) Int. Cl.
*G06F 12/00* (2006.01)
*G06F 13/00* (2006.01)

(52) U.S. Cl. .............. 711/154; 711/100; 711/112; 711/113

(58) Field of Classification Search ........ 711/112, 711/154, 100, 113; 369/375.3
See application file for complete search history.

(56) References Cited

U.S. PATENT DOCUMENTS

| | | | |
|---|---|---|---|
| 5,295,126 A * | 3/1994 | Okano et al. ............ 369/47.54 |
| 5,691,972 A * | 11/1997 | Tsuga et al. ............. 369/275.3 |
| 5,978,336 A * | 11/1999 | Mine et al. .............. 369/47.14 |
| 6,243,338 B1 * | 6/2001 | Mine ....................... 369/47.1 |
| 6,883,111 B2 * | 4/2005 | Yoshida et al. ................ 714/6 |
| 2003/0091334 A1 * | 5/2003 | Noguchi ..................... 386/70 |
| 2003/0151994 A1 * | 8/2003 | Tasaka et al. ............ 369/47.53 |

FOREIGN PATENT DOCUMENTS

| | | |
|---|---|---|
| JP | 02-216621 | 8/1990 |
| JP | 11-238312 | 8/1999 |
| JP | 2001-036161 | 2/2000 |

(Continued)

OTHER PUBLICATIONS

Korean Office Action mailed on Aug. 30, 2005 in Korean Patent Application No. 10-2002-0005647 which corresponds to U.S. Appl. No. 10/355,235.
Japanese Office Action issued on Feb. 7, 2006, in Japanese Patent Application No. 2003-21002 which corresponds to U.S. Appl. No. 10/355,235.
Chinese Office Action issued Jun. 23, 2006, in Chinese Patent Application No. 03103529.9 which corresponds to U.S. Appl. No. 10/355,235.

*Primary Examiner*—Tuan V. Thai
(74) *Attorney, Agent, or Firm*—Staas & Halsey LLP (57) ABSTRACT

A storage medium and an apparatus and a method for recording and reproducing data using the storage medium are provided where additional data is recorded after finalization. The storage medium includes a data recording region, and a title search information region in which, every time data is recorded in the data recording region, information is additionally recorded so that a predetermined recorder/reproducer can recognize the data.

27 Claims, 3 Drawing Sheets

FOREIGN PATENT DOCUMENTS

| | | |
|---|---|---|
| JP | 2000-082276 | 3/2000 |
| JP | 2000-315358 | 11/2000 |
| JP | 2001-035084 | 2/2001 |
| JP | 2001-052466 | 2/2001 |
| JP | 2001-110055 | 4/2001 |
| JP | 2001-148166 | 5/2001 |
| JP | 2003-085944 | 3/2003 |
| KR | 10-0221423 | 11/1996 |
| KR | 2001-148166 | 5/2001 |
| WO | 01/01682 | 1/2001 |

* cited by examiner

STORAGE MEDIUM ON WHICH DATA CAN BE FURTHER WRITTEN AFTER FINALIZATION AND APPARATUS AND METHOD FOR RECORDING AND REPRODUCING DATA USING THE STORAGE MEDIUM

CROSS-REFERENCE TO RELATED APPLICATIONS

This application claims the priority of Korean Patent Application No. 2002-5647, filed Jan. 31, 2002, in the Korean Intellectual Property Office, the disclosure of which is incorporated herein in its entirety by reference.

BACKGROUND OF THE INVENTION

1. Field of the Invention

The present invention relates to a storage medium and an apparatus to record and/or to reproduce data, and more particularly, to a storage medium on which data can be further written after finalization is completed, and an apparatus and a method to record and/or to reproduce data using the storage medium.

2. Description of the Related Art

Storage media, such as digital versatile discs (DVDs), adopt a file management manner according to ISO 9660 standards. According to the ISO 9660 standards, a DVD storage medium, such as a DVD-R or a DVD-RW, is supposedly manufactured to have a file structure in which video manager (VMG) information, video title set (VTS) information, and title information are separately specified. The VMG information includes information on the collection of titles recorded on the storage medium. The VTS information is positioned under the VMG information in the file structure of the DVD storage medium, and includes information on each individual title. The title information belongs to a structure positioned under the VTS information and is information on unit data, such as a movie or a musical track.

In order for a general apparatus to record and/or to reproduce data to recognize the storage medium on which the title information and the VTS information are recorded and to reproduce titles recorded on the storage medium, title search information, which helps to search for titles, must be recorded in a specific VMG region. Accordingly, an apparatus to record the data on the aforementioned storage medium following ISO 9660 standards, records titles on the storage medium and information of the titles in the VMG region, which is generally called finalization of the storage medium. In the case of the DVD-R, it is impossible to correct or renew the data stored in the storage medium after the finalization of the storage medium. It is also impossible to delete the data stored in the storage medium and, additionally, to record the data on the storage medium. A conventional apparatus to reproduce the data can only recognize finalized storage media and reproduce titles recorded on the finalized storage medium according to the finalization information.

In the conventional finalization recording method using the aforementioned storage medium, a user can only record data on the DVD-R once. Accordingly, if, for example, 1 MB of data is recorded on a 4.9 GB DVD-R, because the DVD-R cannot be recorded on again after finalization, 4.8 GB of memory space are wasted.

SUMMARY OF THE INVENTION

The present invention provides a storage medium on which data can be further recorded after finalization, and an apparatus and a method to record and/or to reproduce the data using the storage medium.

The present invention also provides a storage medium on which data can be recorded and reproduced without being finalized, and an apparatus and a method to record and/or to reproduce the data using the storage medium.

Additional aspects and advantages of the invention will be set forth in part in the description which follows and, in part, will be obvious from the description, or may be learned by practice of the invention.

According to an aspect of the present invention, there is provided a storage medium. The storage medium includes a data recording region; and a title search information region wherein, when data is recorded in the data recording region, information on the data is additionally recorded where a predetermined recorder/reproducer recognizes the data.

According to an aspect of the present invention, the information on the data in the title search information region is title search pointer table TT_SRPT information.

According to an aspect of the present invention, the title search pointer table TT_SRPT information is written in a recording management area (RMA) of the storage medium.

According to an aspect of the present invention, the title search pointer table TT_SRPT information is written in a field No. 2, 13, or 14 among predetermined RMD blocks of the RMA.

According to an aspect of the present invention, video-related information is written in a predetermined region of the data recording region.

According to an aspect of the present invention, the predetermined region is located next to a region where the data is recorded last.

According to an aspect of the present invention, information in the location of the predetermined region is recorded in an RMA.

To achieve another aspect of the present invention, there is provided an apparatus for recording data on a storage medium. The apparatus includes a recording controller recording data on the storage medium and recording title search information of the data in an RMA of the storage medium.

To achieve another aspect of the present invention, there is provided an apparatus for recording data on a storage medium. The apparatus includes a recording controller recording data in a data recording region of the storage medium and recording title search information of the data in a predetermined region of the data recording region.

According to an aspect of the present invention, the predetermined region is located next to a region where the data is recorded last.

According to an aspect of the present invention, information in the location of the predetermined region is recorded in an RMA of the storage medium.

According to another aspect of the present invention, there is provided an apparatus for reproducing data from a storage medium, which has undergone finalization. The apparatus includes a reproduction controller reading finalization information of the storage medium and title search information of an RMA, recognizing data recorded on the storage medium using the finalization information and the title search information, and reproducing the data.

According to an aspect of the present invention, the title search information is title search pointer table TT_SRPT information.

According to another aspect of the present invention, there is provided an apparatus for reproducing data from a storage medium, which has undergone finalization. The apparatus includes a reproduction controller recognizing data recorded on the storage medium using finalization information and title search information read from a data recording region of the storage region, and reproducing the data.

According to an aspect of the present invention, the title search information is title search pointer table TT_SRPT information.

According to an aspect of the present invention, the title search information on additionally recorded data is read from a region next to a region where the data is recorded last.

According to another aspect of the present invention, there is provided an apparatus for reproducing data from a storage medium. The apparatus includes a reproduction controller reading title search information from an RMA of the storage medium, recognizing data recorded on the storage medium, and reproducing the data.

According to an aspect of the present invention, the title search information is title search pointer table TT_SRPT information.

According to another aspect of the present invention, there is provided an apparatus for reproducing data from a storage medium. The apparatus includes a reproduction controller recognizing data recorded on the storage medium using title search information read from a data recording region of the storage medium, and reproducing the data.

According to an aspect of the present invention, the title search information is title search pointer table TT_SRPT information.

According to another aspect of the present invention, there is provided a method of recording data on a storage medium. The method involves recording data in a data recording region of the storage medium; and recording title search information of the recorded data in a predetermined recordable region of the storage medium after completing recording of the data.

According to an aspect of the present invention, the predetermined recordable region is an RMA of the storage medium.

According to an aspect of the present invention, the predetermined recordable region is in the data recording region, next to a region where data is recorded last.

According to another aspect of the present invention, there is provided a method of reproducing data from a finalized storage medium. The method involves obtaining finalization information of a storage medium; obtaining title search information on user data stored in a predetermined buffer region; and reproducing the user data corresponding to titles to be reproduced according to the title search information.

According to an aspect of the present invention, the predetermined buffer region is an RMA of the storage medium.

According to an aspect of the present invention, the predetermined buffer region is located in a data recording region of the storage medium, next to a region where the user data is recorded last.

According to another aspect of the present invention, there is provided a method of reproducing data from a storage medium. The method involves reading title search information from an RMA of the storage medium; recognizing data recorded on the storage medium using the title search information; and reproducing the data.

According to an aspect of the present invention, the title search information is title search pointer table TT_SRPT information.

According to another aspect of the present invention, there is provided a method of reproducing a storage medium. The method involves reading data recorded on the storage medium using title search information read from a data recording region of the storage medium; and reproducing the data.

According to an aspect of the present invention, the title search information is title search pointer table TT_SRPT information.

According to another aspect of the present invention, there is provided a method of recording user data on and reproducing the user data from a storage medium. The method involves recording the user data in a data recording region of the storage medium; recording title search information of the user data in a predetermined buffer region of the storage medium; reading the title search information from the predetermined buffer region; and reproducing the user data corresponding to the title search information.

According to an aspect of the present invention, the predetermined buffer region is an RMA of the storage medium.

According to an aspect of the present invention, the predetermined buffer region is located in the data recording region of the storage medium, next to a region where the data is recorded last.

According to an aspect of the present invention, there is provided a storage medium. The storage medium includes a data recording region; and a recording management area (RMA) including finalization information, a predetermined number of recording management data (RMD) blocks, and title search information of data recorded in the data recording region, wherein when re-recording the data in the storage medium, which has undergone finalization, title information of the data is recorded in data fields 2, 13, and 14 of at least one of the RMD blocks, and when reproducing the data from the storage medium, the re-recorded data is reproduced using the title information recorded in the one of the RMD blocks and the finalization information.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to like elements throughout. The embodiments are described below in order to explain the present invention by referring to the figures.

A process of recording data along with title search information on a storage medium, is called finalization. In the past, once the title search information is recorded in a VMG region of the storage medium, it is impossible to correct and renew the title search information again. Because it is impossible to renew and add the title search information in the VMG region even after new data is recorded on the storage medium, it is impossible to recognize and reproduce the new data.

Figure 1A:
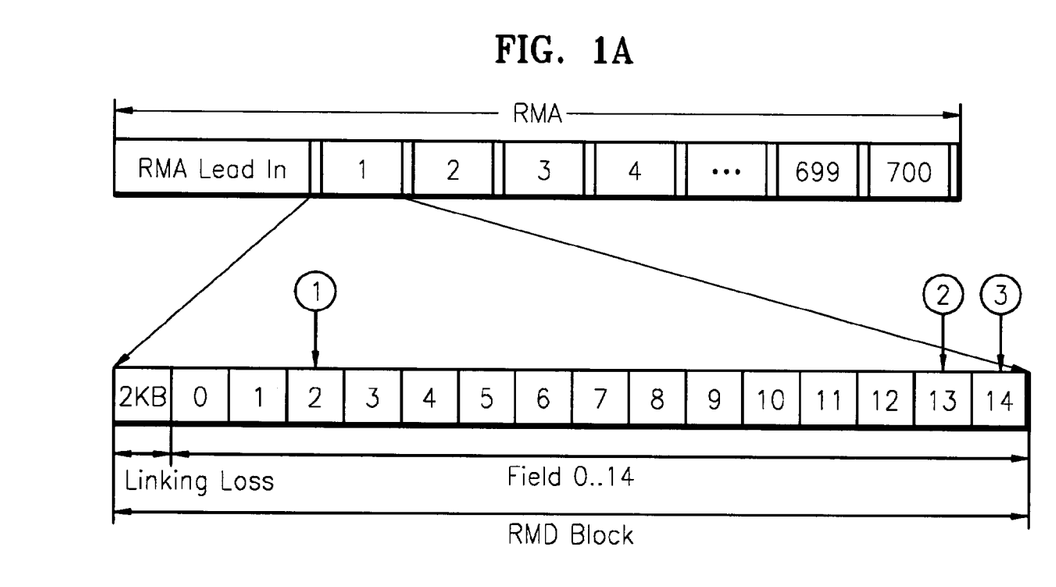
FIG. 1A is a diagram illustrating a structure of a storage medium on which data can be further recorded after finalization, according to an aspect of the present invention.

FIG. 1A is a diagram illustrating a structure of the storage medium, on which a user can further record the data after the finalization. FIG. 1A shows a structure of a recording management area (RMA) including the title search information on the data recorded in a data recording region (not shown). The RMA includes an RMA lead-in region and about 700 recording management data (RMD) blocks. Each of the RMD blocks includes a linking loss region of about 2 KB and data fields 0 through 14.

When recording data again in the storage medium that has already been finalized, the title information of the data is recorded in a data field 2 ①, a data field 13 ②, and a data field 14 ③ of an RMD block. When reproducing the data from the storage medium on which the title information of the data additionally recorded after finalization is stored in the RMA, it is possible to reproduce the additionally recorded data using the title information recorded in the RMD block as well as finalization information. Finalization information indicates that a finalization has been performed. When recording the data once again in the storage medium, the title information of the data is recorded in the data fields 2, 13, and 14 of another RMD block.

In order to finalize the storage medium and make the storage medium compatible to record and/or to reproduce data, the title information and the VTS information of the data recorded on the storage medium are required. For example, under DVD standards, a number of titles in a DVD-video is limited to 99, and, thus, it is possible to record all the titles using one data field of the RMD block. According to the DVD standards, a title unit (TIU) in a title search pointer table TT_SPRT of VMG1 and a port-of-title search pointer table of the VTS information show titles and a list of the titles. When recording the information on the title search pointer table TT_SPRT and the VTS information separately, two or more data fields are necessary. Accordingly, such information for a compatibility of the storage medium can be recorded in the data fields 2, 13, and 14.

As described above, in the present invention, the finalization is performed not in the VMG region but in the RMA, and, thus, it is possible to update or add the title search information on the newly recorded data to the storage medium on which the data has already been recorded, even after finalization.

The structure shown in FIG. 1A may be applied to the storage medium on which the title search information TT_SRPT is recorded in the RMA, when recording the user data without finalization.

In order to recognize the storage medium having the structure shown in FIG. 1A, an apparatus to record and/or to reproduce data according to new standards is needed.

The apparatus (not shown) for recording the data on the storage medium shown in FIG. 1A includes a recording controller which records the data on the storage medium and records the title search information or the VMG information in the RMA of the storage medium. When the user wants to additionally record new data on the storage medium still having some storage capacity, the recording controller allows the new data to be additionally recorded in an empty data region of the storage medium and allows the title search information of the new data to be recorded in the RMA. The operation of the recording controller may be applied to a non-finalized storage medium, as well as to a finalized storage medium. In the case of the finalized storage medium, only the title search information of additionally recorded data is recorded in the RMA of the finalized storage medium. In the case of the non-finalized storage medium, the title search information of all the data recorded on the non-finalized storage medium is recorded in the RMA. In the case of a storage medium, such as the DVD-RW, which allows the user to correct the recorded data, the recording controller can correct the title search information of the corrected data in the RMA.

The apparatus (not shown) for reproducing the data from the storage medium shown in FIG. 1A includes a reproduction controller. When the storage medium is inserted and a command to reproduce the data from the storage medium is input, the reproduction controller reads the finalization information and the title search information recorded in the RMA of the storage medium so as to recognize the structure of the storage medium. The reproduction controller reproduces titles indicated by the title search information read from the RMA. The reproduction controller may be realized as a conventional micom employed in a storage media reproducer or as hardware provided separately from the storage medium reproducer.

Figure 1B:
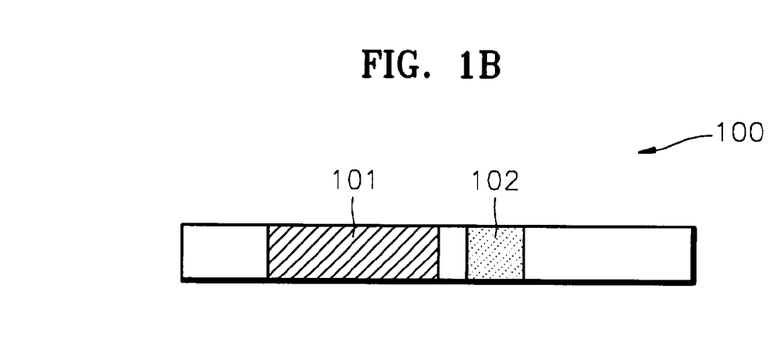
FIG. 1B is a diagram illustrating the structure of the storage medium on which the data can be further recorded after finalization, according to another aspect of the present invention.

FIG. 1B is a diagram illustrating another aspect of a data structure of the storage medium according to an aspect of the present invention, on which the data can be additionally recorded after the finalization. Referring to FIG. 1B, title search information 102 of additionally recorded data is recorded in a data recording region 100 of the storage medium along with data 101. In other words, as shown in FIG. 1B, if the data is additionally recorded in an empty space of the data recording region 100 in the storage medium after finalization, a predetermined zone is prepared for the title search information 102 in the data recording region 100. Thereafter, the title search information is recorded in the predetermined zone. In another aspect of the present invention, the predetermined zone prepared for the title search information 102 in the data recording region 100 is, according to an aspect of the present invention, a region following a region where the data is recorded last. In the case of additionally recording data on the DVD-RW, the additionally recorded data is overwritten in a previous title search information region. Subsequently, previous title search information and the title search information of the additionally recorded data are newly written in the region following the region where data is recorded last. In the case of additionally recording data on a DVD-R, the additional data is written in another empty data recording region, and the title search information of the additional data is written in, for example, a predetermined empty space next to an additional data recording region. Information on a location of the region where the title search information of the additional data is recorded will be included in the RMA.

The structure shown in FIG. 1B may also be applied to the storage medium which allows title search information TT_SRPT of data to be recorded in a predetermined empty space of the data recording region without being finalized, when the user records the data.

In order to recognize the storage medium having the structure shown in FIG. 1B, an apparatus to record and/or to reproduce the data in consideration of the structure of the storage medium is necessary.

The apparatus (not shown) for recording data on the storage medium shown in FIG. 1B includes a recording controller which records data in the data recording region 100 of the storage medium and then records the title search information TT_SRPT in a predetermined region of the data recording region 100. The recording controller searches the finalized storage medium for an available recording space, records the data on the finalized storage medium, and then records the title search information of the additionally recorded data in a predetermined region of the data recording region 100, for example, a region next to the region where the additionally recorded data is stored. Alternatively, every time the user records the data, the recording controller records the title search information corresponding to the data in a predetermined region of the data recording region of the non-finalized storage medium. The recording controller may correct the data stored in the data recording region, and then may correct and record the title search information in accordance with the corrected data. The recording controller records the information on the location of the region where the title search information is recorded in the RMA (not shown).

The apparatus (not shown) for reproducing data from the inventive storage medium shown in FIG. 1B includes a reproduction controller. When the finalized storage medium is inserted and a command to reproduce the data from the finalized storage medium is input, the reproduction controller searches the title search information recorded in the predetermined region of the data recording region of the finalized storage medium, as well as, the finalization information. The reproduction controller reproduces the data from the finalized storage medium according to the searched information. When the non-finalized storage medium is inserted and a command to reproduce the data from the non-finalized storage medium is input, the reproduction controller only searches the title search information recorded in the data recording region, recognizes the structure of data corresponding to the title search information, and reproduces the data. The title search information may be read from a predetermined region of the data recording region in the RMA of a storage medium.

Figure 2:
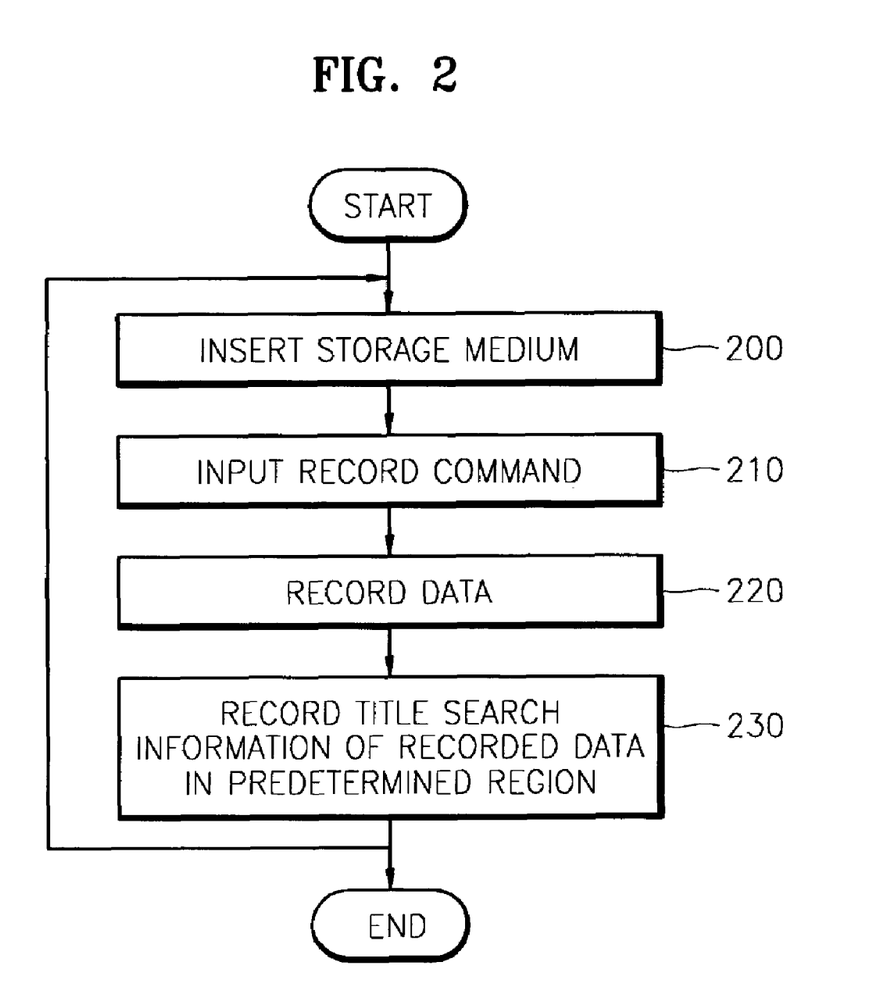
FIG. 2 is a flowchart of a method of recording the data on the storage medium on which the data can be further recorded after finalization, according to an aspect of the present invention.

FIG. 2 is a flowchart of a method of recording the data on the storage medium, according to an aspect of the present invention. Referring to FIG. 2, at operation 200, the storage medium is inserted, at operation 210, a record command is input, and, at operation 220, the data is recorded in an appropriate data recording region of the storage medium. After completing recording of the data, the title search information TT_SRPT of the recorded data is recorded in the predetermined recordable region of the storage medium. If the data is additionally recorded on the storage medium after operation 230, the title search information of the additionally recorded data may be added to the title search information recorded in the predetermined recordable region.

According to an aspect of the present invention, the predetermined recordable region of the storage medium may be the RMA shown in FIG. 1A, or part of the data recording region of the storage medium shown in FIG. 1B. Specifically, when the title search information is written in part of the data recording region, the predetermined recordable region is, according to an aspect of the present invention, a region next to the region where data is recorded last.

In the case of recording the data on the finalized storage medium, the method of FIG. 2 is only performed for recording additional data. In the case of recording data on the non-finalized storage medium, the method of FIG. 2 is performed for all data to be recorded on the non-finalized storage medium, including the data to be written on the non-finalized storage medium, first, and the data to be additionally recorded on the non-finalized storage medium.

Figure 3:
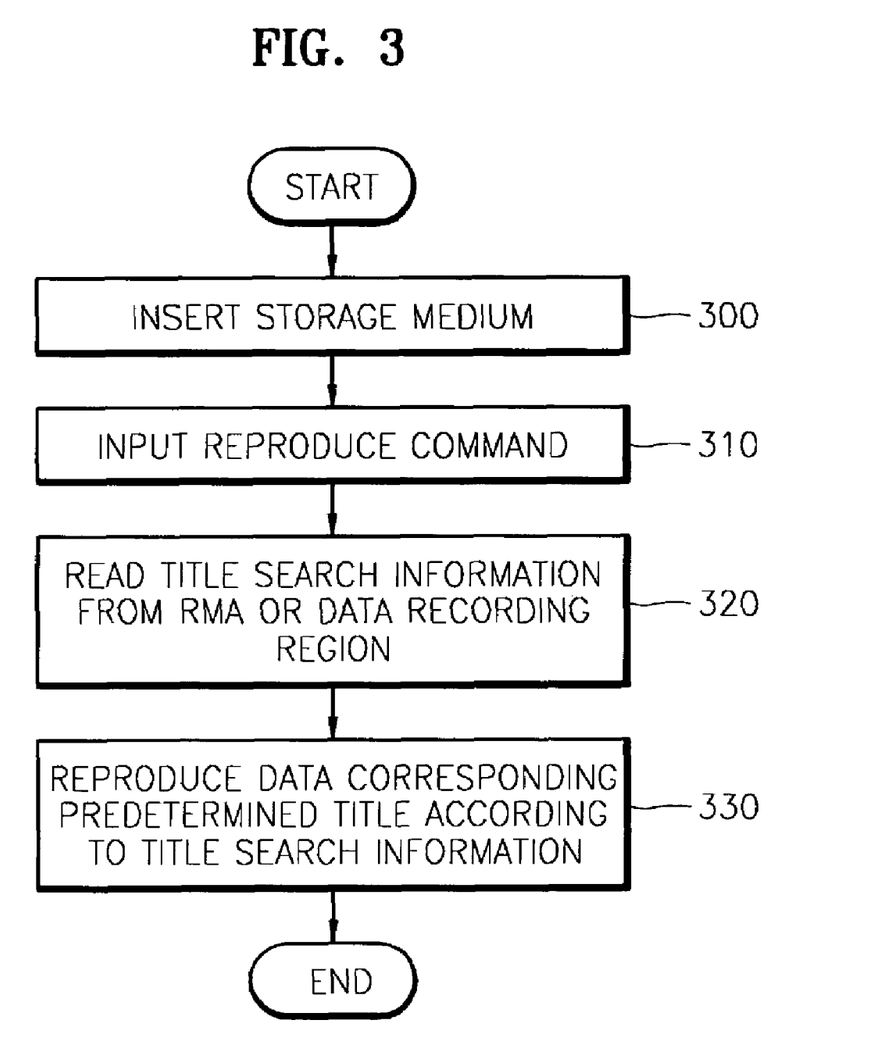
FIG. 3 is a flowchart of a method of reproducing the data from the storage medium on which the data can be further recorded, according to an aspect of the present invention.

FIG. 3 is a flowchart of a method of reproducing the data from the storage medium on which the data can be additionally recorded after finalization, according to an aspect of the present invention. Referring to FIG. 3, at operation 300, the storage medium is inserted, and at operation 310, a reproduction command is input. If the storage medium has been finalized, at operation 320, the title search information TT_SRPT is searched for in the finalized region and a predetermined buffer region of the storage medium. If the storage medium has not been finalized, only the predetermined buffer region of the storage medium is searched, and the title search information TT_SRPT is read from the predetermined buffer region of the storage medium. At operation 330, titles to be reproduced are searched for, according to the searched title search information, and are reproduced.

The predetermined buffer region is, according to an aspect of the present invention, part of the RMA or the data recording region of the storage medium. When the predetermined buffer region is part of the data recording region of the storage medium, according to an aspect of the present invention, the predetermined buffer region is located next to the region where data is recorded last.

As described above, according to the present invention, it is possible to additionally record data on a storage medium which has already been through finalization, and reproduce the additionally recorded data. In addition, it is possible to record the data on the storage medium irrespective of a recording session, as long as there remains a recordable region in the storage medium. Further, it is possible to reproduce the data recorded on the storage medium by recording data and title search information on the storage medium, according to an aspect the present invention, without finalizing the storage medium.

Therefore, according to the present invention, it is possible to effectively manage and use the storage capacity of the storage medium by making it possible to record the data on either a finalized storage medium or a non-finalized storage medium and reproduce the data.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rewritable storage medium, comprising:
   a data recording region; and
   a title search information region wherein, when data is recorded in the data recording region after finalization of the storage medium, information on the data is additionally recorded where a predetermined recorder/reproducer recognizes the data, wherein the information on the data in the title search information region is title search pointer table TT SRPT information, and wherein the title search pointer table TT SRPT information after finalization is written in a recording management area (RMA) of the rewritable storage medium.

2. The rewritable storage medium of claim 1, wherein the title search pointer table TT_SRPT information is written in a field No. 2, 13, or 14 among predetermined recording management data (RMD) blocks of the RMA.

3. The rewritable storage medium of claim 1, wherein video-related information is written in a predetermined region of the data recording region.

4. The rewritable storage medium of claim 3, wherein the predetermined region is located next to a region where the data is recorded last.

5. The rewritable storage medium of claim 3, wherein information on the location of the predetermined region is recorded in an RMA.

6. An apparatus for recording data on a rewritable storage medium, comprising:

a recording controller recording data on the rewritable storage medium after finalization of the storage medium and recording title search information of the data in an RMA of the rewritable storage medium after finalization of the storage medium, wherein the title search information of the data in the title search information region is title search pointer table TT_SRPT information, and wherein the title search pointer table TT_SRPT information after finalization is written in a recording management area (RMA) of the rewritable storage medium.

7. An apparatus for recording data on a rewritable storage medium, comprising:

a recording controller recording data in a data recording region of the rewritable storage medium after finalization of the storage medium and recording title search information of the data in a predetermined region of the data recording region after finalization of the storage medium, wherein information in the location of the predetermined region is recorded in a recording management area (RMA) of the rewritable storage medium, wherein the title search information of the data in the predetermined region is title search pointer table TT_SRPT information, and wherein the title search pointer table TT_SRPT information after finalization is written in a recording management area (RMA) of the rewritable storage medium.

8. The apparatus of claim 7, wherein the predetermined region is located next to a region where the data is recorded last.

9. An apparatus for reproducing data from a rewritable storage medium, which has undergone finalization, the apparatus comprising:

a reproduction controller reading finalization information of the rewritable storage medium and title search information of a recording management area (RMA), recognizing data recorded on the rewritable storage medium using the finalization information and the title search information, and reproducing the data, wherein the title search information was stored after the storage medium had undergone finalization, and wherein the title search information is title search pointer table TT_SRPT information.

10. An apparatus for reproducing data from a rewritable storage medium, which has undergone finalization, the apparatus comprising:

a reproduction controller recognizing data recorded on the rewritable storage medium using finalization information and title search information read from a data recording region of the storage region, and reproducing the data, wherein the title search information was stored after the storage medium had undergone finalization, wherein the title search information is title search pointer table TT_SRPT information, and wherein the title search pointer table TT_SRPT information after finalization is written in a recording management area (RMA) of the rewritable storage medium.

11. The apparatus of claim 10, wherein the title search information on additionally recorded data is read from a region next to a region where the data is recorded last.

12. An apparatus for reproducing data from a rewritable storage medium, comprising:

a reproduction controller reading title search information from a recording management area (RMA) of the rewritable storage medium, recognizing data recorded on the rewritable storage medium after finalization of the storage medium, and reproducing the data, wherein the title search information is title search pointer table TT_SRPT information, and wherein the title search pointer table TT SRPT information after finalization is written in a recording management area (RMA) of the rewritable storage medium.

13. An apparatus for reproducing data from a rewritable storage medium, comprising:

a reproduction controller recognizing data recorded on the rewritable storage medium after finalization of the storage medium using title search information read from a recording management region of the rewritable storage medium, and reproducing the data, wherein the title search information is title search pointer table $TT_{13}$ SRPT information, and wherein the title search pointer table TT_SRPT information after finalization is written in the recording management area (RMA) of the rewritable storage medium.

14. A method of recording data on a rewritable storage medium, comprising:

recording data in a data recording region of the rewritable storage medium after finalization of the storage medium; and recording title search information of the recorded data in a predetermined recordable region of the rewritable storage medium after completing recording of the data, wherein the predetermined recordable region is a recording management area (RMA) of the rewritable storage medium, wherein the title search information is title search pointer table TT_SRPT information, and wherein the title search pointer table TT_SRPT information after finalization is written in the recording management area (RMA) of the rewritable storage medium.

15. The method of claim 14, wherein the predetermined recordable region is in the data recording region, next to a region where data is recorded last.

16. A method of reproducing data from a finalized rewritable storage medium, comprising:

obtaining finalization information of a rewritable storage medium;

obtaining title search information on user data stored in a predetermined buffer region after finalization of the storage medium; and reproducing the user data corresponding to titles to be reproduced according to the title search information, wherein the predetermined buffer region is a recording management area (RMA) of the rewritable storage medium, wherein the title search information is title search pointer table TT_SRPT information, and wherein the title search pointer table TT_SRPT information after finalization is written in the recording management area (RMA) of the rewritable storage medium.

17. The method of claim 16, wherein the predetermined buffer region is located in a data recording region of the rewritable storage medium, next to a region where the user data is recorded last.

18. A method of reproducing data from a rewritable storage medium, comprising:

reading title search information from a recording management area (RMA) of the rewritable storage medium;

recognizing data recorded on the rewritable storage medium after finalization of the storage medium using the title search information; and reproducing the data, wherein the title search information is title search pointer table TT_SRPT information, and wherein the title search pointer table TT_SRPT information after finalization is written in the recording management area (RMA) of the rewritable storage medium.

19. A method of reproducing a rewritable storage medium, comprising:

reading data recorded on the rewritable storage medium after finalization of the storage medium using title search information read from a data recording region of the rewritable storage medium; and reproducing the data, wherein the title search information is title search pointer table TT_SRPT information, and wherein the title search pointer table TT_SRPT information after finalization is written in a recording management area (RMA) of the rewritable storage medium.

20. A method of recording user data on and reproducing the user data from a rewritable storage medium, comprising:

recording the user data in a data recording region of the rewritable storage medium after finalization of the storage medium;

recording title search information of the user data in a predetermined buffer region of the rewritable storage medium;

reading the title search information from the predetermined buffer region; and reproducing the user data corresponding to the title search information, wherein the predetermined buffer region is a recording management area (RMA) of the rewritable storage medium, wherein the title search information is title search pointer table TT_SRPT information, and wherein the title search pointer table TT_SRPT information after finalization is written in the recording management area (RMA) of the rewritable storage medium.

21. The method of claim 20, wherein the predetermined buffer region is located in the data recording region of the rewritable storage medium, next to a region where the data is recorded last.

22. A storage medium, comprising:

a data recording region; and a recording management area (RMA) comprising finalization information, a predetermined number of recording management data (RMD) blocks, and title search information of data recorded in the data recording region, wherein when re-recording the data in the storage medium, which has undergone finalization, title information of the data is recorded in data fields 2, 13, and 14 of at least one of the RMD blocks, and when reproducing the data from the storage medium, the re-recorded data is reproduced using the title information recorded in the one of the RMD blocks and the finalization information.

23. The storage medium of claim 22, wherein when recording the data once again in the storage medium, the title information of the data is recorded in the data fields 2, 13, and 14 of another RMD block.

24. The storage medium of claim 22, wherein when the storage medium is a finalized storage medium, the title search information of additionally recorded data is exclusively recorded in the RMA of the finalized storage medium.

25. The storage medium of claim 22, wherein when the storage medium is a non-finalized storage medium, the title search information of all the data recorded on the non-finalized storage medium is recorded in the RMA.

26. The storage medium of claim 22, wherein when the data is recorded in an empty space of the data recording region in the storage medium after finalization, a predetermined zone is prepared for the title search information in the data recording region.

27. A rewritable storage medium, comprising:

a data recording region; and a recording management area (RMA) comprising finalization information, a predetermined number of recording management data (RMD) blocks, and title search information of data recorded in the data recording region, wherein when re-recording the data in the rewritable storage medium, which has undergone finalization, title information of the data is recorded in data fields of at least one of the RMD blocks, and when reproducing the data from the rewritable storage medium, the re-recorded data is reproduced using the title information recorded in the one of the RMD blocks and the finalization information.

* * * * *

UNITED STATES PATENT AND TRADEMARK OFFICE
CERTIFICATE OF CORRECTION

PATENT NO. : 7,287,130 B2 Page 1 of 1
APPLICATION NO. : 10/355235
DATED : October 23, 2007
INVENTOR(S) : Sang-am Lee It is certified that error appears in the above-identified patent and that said Letters Patent is hereby corrected as shown below:

Column 9, Line 2, change "TT SRPT" to --TT_SRPT--.

Column 9, Line 4, change "TT SRPT" to --TT_SRPT--.

Column 10, Line 29, change "TT SRPT" to --TT_SRPT--.

Column 10, Line 40, change "$TT_{13}SRPT$" to --TT_SRPT--.

Signed and Sealed this

Fifteenth Day of April, 2008

JON W. DUDAS
*Director of the United States Patent and Trademark Office*